(12) United States Patent
Kuffner, Jr.

(10) Patent No.: US 11,629,835 B2
(45) Date of Patent: Apr. 18, 2023

(54) AUTO-CALIBRATION OF VEHICLE SENSORS

(71) Applicant: Toyota Jidosha Kabushiki Kaisha, Toyota (JP)

(72) Inventor: James J. Kuffner, Jr., Minato-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 459 days.

(21) Appl. No.: 16/527,682

(22) Filed: Jul. 31, 2019

(65) Prior Publication Data
US 2021/0033255 A1 Feb. 4, 2021

(51) Int. Cl.
*F21S 41/60* (2018.01)
*G06T 7/80* (2017.01)
(Continued)

(52) U.S. Cl.
CPC ............ *F21S 41/60* (2018.01); *B60Q 1/0023* (2013.01); *B60Q 1/06* (2013.01); *G01S 7/4972* (2013.01);
(Continued)

(58) Field of Classification Search
CPC ......... F21S 41/60; B60Q 1/0023; B60Q 1/06; B60Q 2400/50; G01S 7/4972; G06T 7/80; G06T 7/90; G06T 2207/10012; G06T 2207/30208; G06T 2207/30252; G06T 7/85
See application file for complete search history.

(56) References Cited

U.S. PATENT DOCUMENTS 8,280,665 B2 * 10/2012 Nakamura ................ G06T 7/80
702/95
9,201,424 B1 * 12/2015 Ogale ....................... G06T 7/80
(Continued)

FOREIGN PATENT DOCUMENTS

DE     102006056232 B4 * 8/2017 ........... H04N 17/002
JP     2007-274564 A     10/2007
(Continued)

OTHER PUBLICATIONS

Miseikis, Justinas et al., "Automatic Calibration of a Robot Manipulator and Multi 3D Camera System" https//arxiv.org/abs/1601.01566, Jan. 7, 2016.
(Continued)

*Primary Examiner* — Mohamed K Amara
(74) *Attorney, Agent, or Firm* — Dinsmore & Shohl LLP

(57) ABSTRACT

A system for automatically calibrating sensors of a vehicle includes an electronic control unit, a projector communicatively coupled to the electronic control unit, a first sensor communicatively coupled to the electronic control unit, and a second sensor communicatively coupled to the electronic control unit. The electronic control unit is configured to project, with the projector, a calibration pattern onto a surface, capture, with the first sensor, a first portion of the calibration pattern, capture, with the second sensor, a second portion of the calibration pattern, and calibrate the first sensor and the second sensor based on at least one feature sensed within the first portion of the calibration pattern and the second portion of the calibration pattern.

20 Claims, 4 Drawing Sheets

(51) Int. Cl.
*B60Q 1/06* (2006.01)
*B60Q 1/00* (2006.01)
*G06T 7/90* (2017.01)
*G01S 7/497* (2006.01)

(52) U.S. Cl.
CPC .................. *G06T 7/80* (2017.01); *G06T 7/90* (2017.01); *B60Q 2400/50* (2013.01)

(56) References Cited

U.S. PATENT DOCUMENTS

| | | | | |
|---|---|---|---|---|
| 9,727,793 | B2* | 8/2017 | Heisele | G01C 21/28 |
| 9,933,515 | B2* | 4/2018 | Prokhorov | G01S 7/4972 |
| 10,337,954 | B2* | 7/2019 | Helwig | G01M 11/064 |
| 10,412,368 | B2* | 9/2019 | Osterwood | G01S 7/4972 |
| 10,447,995 | B1* | 10/2019 | Curlander | H04N 13/246 |
| 10,540,784 | B2* | 1/2020 | Surazhsky | G06T 7/80 |
| 10,554,950 | B1* | 2/2020 | Curlander | H04N 13/332 |
| 10,560,679 | B2* | 2/2020 | Zhao | H04N 13/128 |
| 10,814,775 | B2* | 10/2020 | Schneider | G06T 7/85 |
| 10,884,110 | B2* | 1/2021 | Wu | G06T 7/136 |
| 11,025,887 | B2* | 6/2021 | Hicks | G01B 11/272 |
| 11,195,264 | B1* | 12/2021 | Farnsworth | G06K 9/46 |
| 11,270,462 | B2* | 3/2022 | Hagenburg | H04N 17/002 |
| 2001/0012985 | A1* | 8/2001 | Okamoto | G06T 7/80 |
| | | | | 702/85 |
| 2006/0017720 | A1* | 1/2006 | Li | G06T 17/10 |
| | | | | 345/419 |
| 2008/0031514 | A1* | 2/2008 | Kakinami | G06T 7/80 |
| | | | | 382/154 |
| 2008/0186384 | A1* | 8/2008 | Ishii | H04N 17/002 |
| | | | | 348/E17.002 |
| 2008/0231710 | A1* | 9/2008 | Asari | G06T 7/80 |
| | | | | 348/187 |
| 2009/0086081 | A1* | 4/2009 | Tan | G01B 11/2509 |
| | | | | 348/333.1 |
| 2009/0290032 | A1* | 11/2009 | Zhang | B60R 1/00 |
| | | | | 348/211.9 |
| 2010/0235129 | A1* | 9/2010 | Sharma | G01S 17/86 |
| | | | | 702/97 |
| 2011/0037725 | A1* | 2/2011 | Pryor | B60K 37/06 |
| | | | | 345/173 |
| 2012/0007985 | A1* | 1/2012 | Inui | H04N 17/002 |
| | | | | 348/148 |
| 2012/0106183 | A1* | 5/2012 | Takahashi | F21S 41/173 |
| | | | | 362/509 |
| 2012/0120072 | A1* | 5/2012 | Se | G06T 17/00 |
| | | | | 345/420 |
| 2014/0176954 | A1* | 6/2014 | Scott | F41H 13/0056 |
| | | | | 250/492.1 |
| 2014/0240690 | A1* | 8/2014 | Newman | G01S 17/87 |
| | | | | 356/4.01 |
| 2016/0161602 | A1* | 6/2016 | Prokhorov | G01S 7/4026 |
| | | | | 702/97 |
| 2016/0227193 | A1* | 8/2016 | Osterwood | H04N 23/54 |
| 2017/0180706 | A1* | 6/2017 | Salvagnini | H04N 13/254 |
| 2018/0249142 | A1* | 8/2018 | Hicks | G01B 11/2545 |
| 2018/0315213 | A1* | 11/2018 | Surazhsky | G06T 7/55 |
| 2019/0172225 | A1* | 6/2019 | Park | G01S 17/42 |
| 2020/0174107 | A1* | 6/2020 | Briggs | G06T 7/50 |
| 2021/0173412 | A1* | 6/2021 | Agarwal | G05D 1/0297 |
| 2023/0005183 | A1* | 1/2023 | Cantadori | G01S 7/4021 |

FOREIGN PATENT DOCUMENTS

| | | | | |
|---|---|---|---|---|
| JP | 2016-171509 A | | 9/2016 | |
| JP | 6459745 B2 | * | 1/2019 | ............ G01B 11/00 |

OTHER PUBLICATIONS

Heng, Lionel et al., "CamOdoCal: Automatic Intrinsic and Extrinsic Calibration of a Rig with Multiple Generic Cameras and Odometry" https://ieeexplore.ieee.org/document/6696592, 2013 IEEE/RSJ International Conference on Intelligent Robots and Systems, Nov. 2013.

* cited by examiner

AUTO-CALIBRATION OF VEHICLE SENSORS

TECHNICAL FIELD

The present specification generally relates to systems and methods for automatically calibrating sensors on a vehicle.

BACKGROUND

Vehicles increasingly include multiple sensors (e.g., cameras, LIDAR sensors, and the like) that are interconnected to provide vehicle systems with information about a driving environment, other vehicle systems, and/or the operation of the vehicle itself. These sensors may include sensors that enable a vehicle to view an environment, determine a vehicle location, detect objects in a vehicle environment, navigate autonomously or semi-autonomously through an environment, or the like. In order to operate, such sensors should be calibrated.

Accordingly, there is a need for systems and methods for automatically calibrating sensors on a vehicle.

SUMMARY

In one embodiment, a system for automatically calibrating sensors of a vehicle includes an electronic control unit, a projector communicatively coupled to the electronic control unit, a first sensor communicatively coupled to the electronic control unit, and a second sensor communicatively coupled to the electronic control unit. The electronic control unit is configured to project, with the projector, a calibration pattern onto a surface, capture, with the first sensor, a first portion of the calibration pattern, capture, with the second sensor, a second portion of the calibration pattern, and calibrate the first sensor and the second sensor based on at least one feature sensed within the first portion of the calibration pattern and the second portion of the calibration pattern.

In some embodiments, a method for automatically calibrating vehicle sensors includes projecting, with a projector, a calibration pattern onto a surface, capturing, with a first sensor, a first portion of the calibration pattern, capturing, with a second sensor, a second portion of the calibration pattern, and calibrating the first sensor and the second sensor based on at least one feature sensed within the first portion of the calibration pattern and the second portion of the calibration pattern.

In some embodiments, a vehicle that includes an electronic control unit, a projector communicatively coupled to the electronic control unit, a first camera communicatively coupled to the electronic control unit, and a second camera communicatively coupled to the electronic control unit. The electronic control unit is configured to: project, with the projector, a calibration pattern onto a surface, capture, with the first camera, a first portion of the calibration pattern, capture, with the second camera, a second portion of the calibration pattern, and calibrate the first camera and the second camera based on at least one feature sensed within the first portion of the calibration pattern and the second portion of the calibration pattern.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
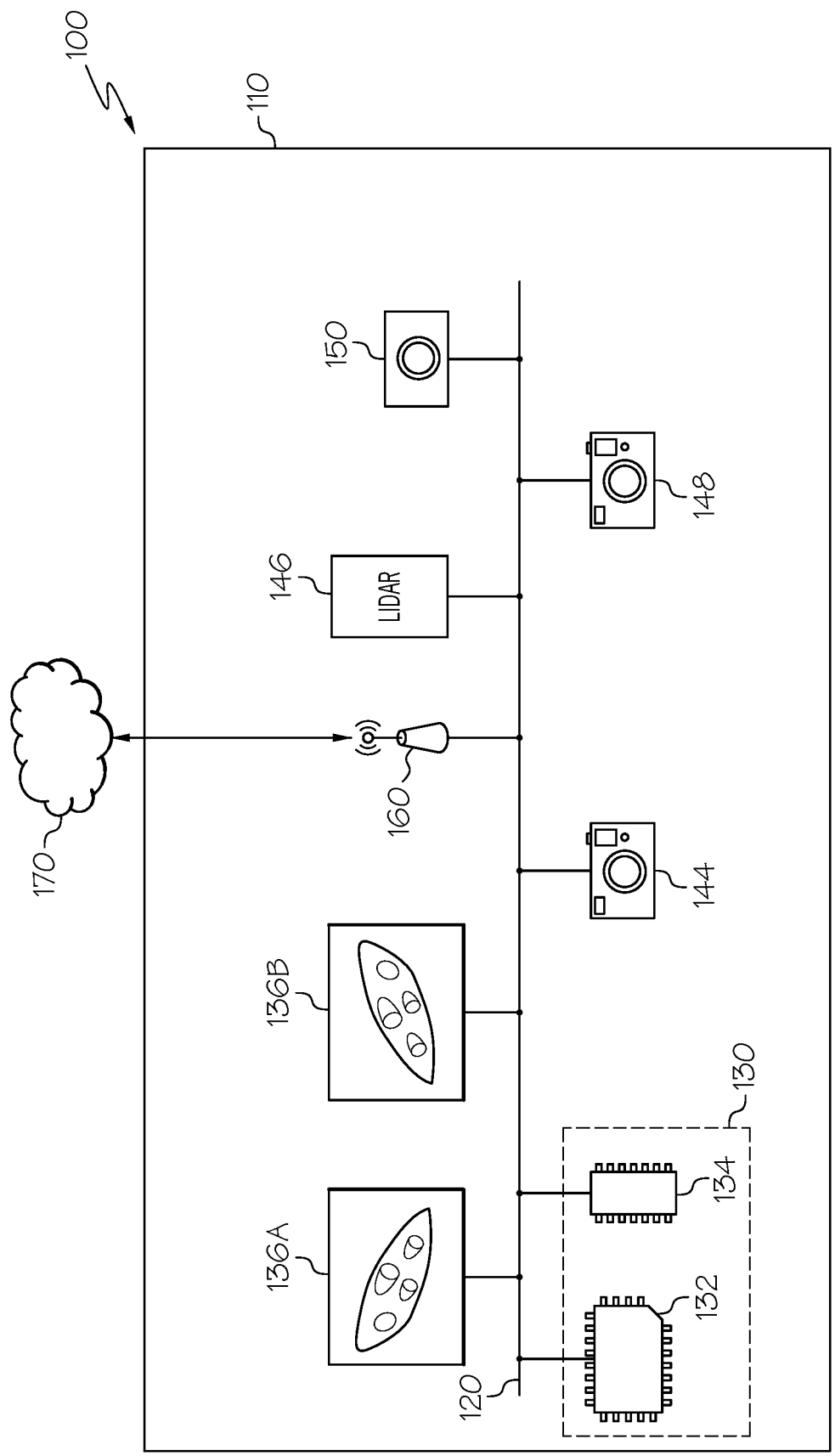
FIG. 1 schematically depicts components of a system for automatically calibrating sensors within a vehicle according to one or more embodiments shown and described herein.

The embodiments disclosed herein relate to systems and methods for automatically calibrating sensors on a vehicle. As vehicle systems become more advanced, vehicles include a greater number of sensors and the vehicle systems rely on a greater degree of accuracy from the sensors. As such, more frequent or environment specific calibrations of the sensors implemented on a vehicle may be required. In other words, sensors installed on vehicles may be initially calibrated or at least their intrinsic and extrinsic values may be known within manufacturing tolerances, however, more accurate calibrations may be desired for operation within vehicle systems. For example, the precise position including location, roll, pitch, and yaw of the sensors with respect to the vehicle and/or other sensors improve the operation of vehicle systems, for example, vehicle systems such as assistive or automated driving systems.

Furthermore, over time, through use, and/or depending on environmental conditions such as changes in temperature, elevation, humidity, or the like, a sensor may become uncalibrated, such as due to a change in the position of a sensor (e.g., variations in the x, y, z location) and/or angle of a sensor (e.g., vertical, horizontal, and/or tilt) and/or other extrinsic or intrinsic features. As such, there is a challenge with dynamically updating the calibration of sensors on vehicles. That is, sensors such as cameras and LIDAR sensors are typically calibrated after the vehicle is manufactured to adjust for any variation in position, angle, or other intrinsic or extrinsic features of the sensor. In general, these calibration processes include calibration systems and equipment outside of the vehicle to perform a calibration. For example, external computing devices and setups for displaying a known target object or pattern at a known distance are typically used in these post manufacturing calibration processes. Since the location of the target is known relative to the vehicle, the sensors may be calibrated for intrinsic distortion (e.g., focal lens adjustments due to lens, warping, or the like) and extrinsic distortion (variations in position and/or angle) of the sensor. However, such calibration systems are not feasible for performing dynamic calibrations; for example, when there is a change in the environment, when an adjustment is needed due to a change in position or equipment of the vehicle, through vibrations and other forces experienced during driving, or the like. The systems and methods of calibration of the sensors described herein improve the accuracy of auto-calibration of multiple vehicle sensors, for example cameras and LIDAR sensors.

Embodiments of the present disclosure include systems and methods that integrate a calibration system and methods of calibration within a vehicle utilizing mathematical relationships based on an initial or assumed calibration of the sensors being calibrated. In some embodiments, automatic vehicle calibration systems, as described in more detail herein, include a projector, an electronic control unit, and the sensors being calibrated. The projector may project a calibration pattern on a surface that is observable by the sensors being calibrated. The sensors capture at least a portion of the calibration pattern and provide the sensor data to the electronic control unit. The electronic control unit resolves extrinsic and intrinsic features of each of the sensors based on features from the calibration pattern captured by the sensors and, in some instances, a known location of the projector, a known calibration pattern, an aspect ratio of the calibration pattern, and/or the like. As a result, the electronic control unit computes calibration results for each of the sensors.

Systems and methods for automatically calibrating sensors on a vehicle will now be described in more detail herein.

Figure 2:
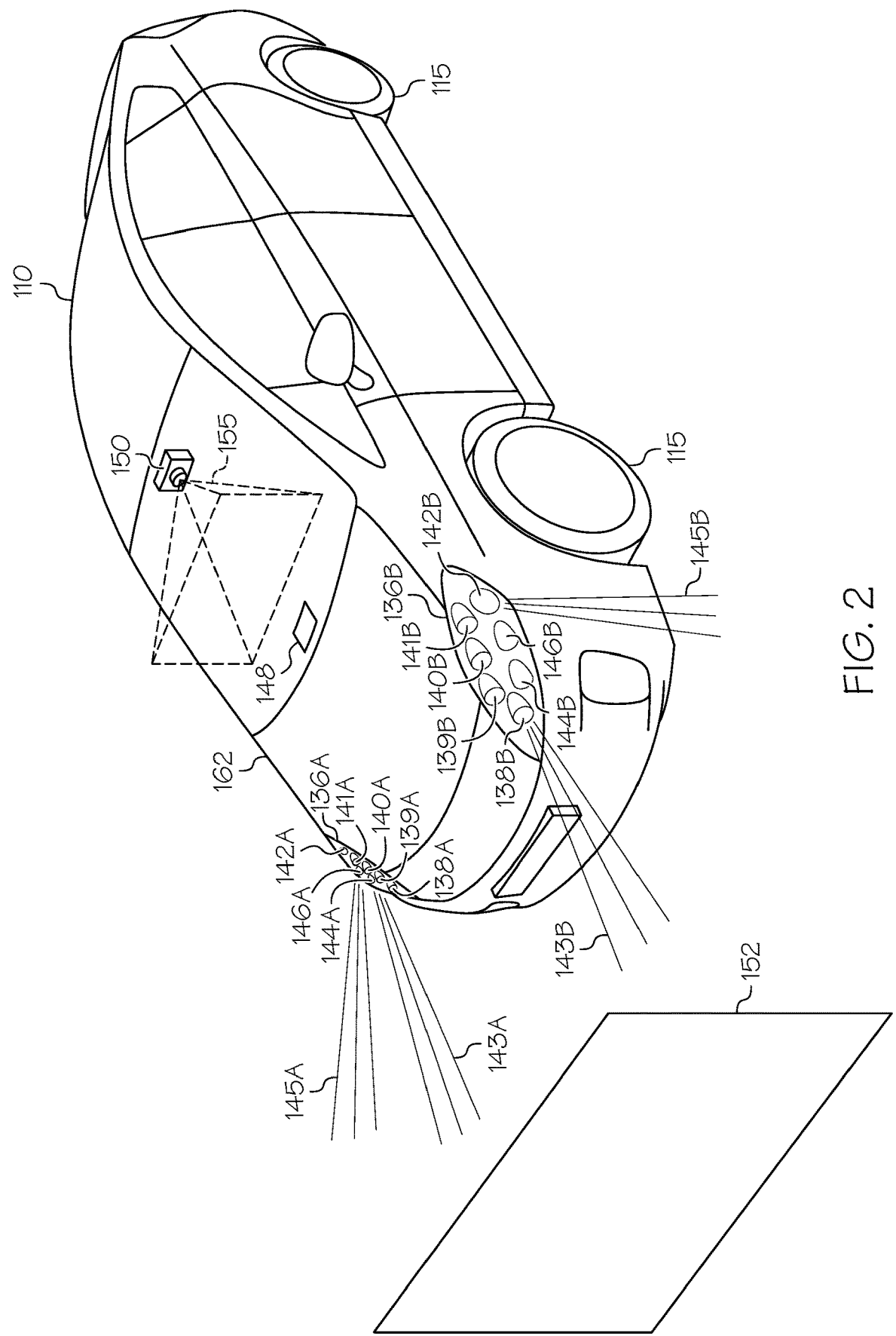
FIG. 2 depicts an illustrative environment and vehicle for automatically calibrating sensors within a vehicle according to one or more embodiments shown and described herein.

Turning now to the drawings wherein like numbers refer to like structures, and particularly to FIGS. 1 and 2, FIG. 1 schematically depicts components of a system for automatically calibrating sensors within a vehicle. FIG. 2 illustratively depicts an example implementation of the system 100 in a vehicle 110 having wheels 115. The system 100 for automatically calibrating sensors within a vehicle 110 includes, a communication path 120, an electronic control unit 130 having a processor 132 and a non-transitory computer readable memory 134, a first vehicle headlamp unit 136A, a second vehicle headlamp unit 136B, one or more cameras 144, 148, one or more LIDAR sensor 146 (collectively referred to herein as sensors 144, 146, 148), a projector 150, and network interface hardware 160. The vehicle 110 may be communicatively coupled to a network 170 by way of the network interface hardware 160. The components of the system 100 are contained within or mounted to a vehicle 110. The various components of the system 100 and the interaction thereof will be described in detail below.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 1, the electronic control unit 130 may be any device or combination of components comprising a processor 132 and non-transitory computer readable memory 134. The processor 132 of the system 100 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer readable memory 134 of the system 100 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer readable memory 134, other embodiments may include more than one memory module.

The system 100 also includes one or more vehicle headlamp units 136 (e.g., a first vehicle headlamp unit 136A and a second vehicle headlamp unit 136B), which are communicatively coupled to the electronic control unit 130 such that the individual lamps within the vehicle headlamp units 136 may be selectively activated, deactivated, or otherwise driven at various frequencies, wavelengths, and/or intensities. The individual lamps of the vehicle headlamp units 136 may be light emitting diodes (LEDs). LEDs may be selectively driven (i.e., programmed) to illuminate portions of a vehicle environment in a pulsed light mode (e.g., at a predetermined frequency), at a predefined wavelength, at a predetermined intensity, or the like to illuminate the environment or generate a calibration pattern as discussed in more detail herein. As shown in FIG. 2 in detail, the vehicle headlamp units 136 may include a number of individual lamps, cameras 144, LIDAR sensor 146, and/or other sensors. The vehicle headlamp units 136 may include a plurality of individual lamps (e.g., the first vehicle headlamp unit 136A may include a first lamp 138A, a second lamp 139A, a third lamp 140A, and a fourth lamp 141A and the second vehicle headlamp unit 136B may include a first lamp 138B, a second lamp 139B, a third lamp 140B, and a fourth lamp 141B). While FIGS. 1 and 2 depict vehicle headlamp units 136 with four individual lamps, vehicle headlamp units 136 may include fewer or more individual lamps that may be controlled by the electronic control unit 130 or another electronic controller of the vehicle 110. Additionally, as described in more detail herein, the individual lamps of the vehicle headlamp units 136 may be configured to operate as the projector 150 for projecting a calibration pattern.

The vehicle headlamp units 136 may further include one or more sensors such as one or more cameras 144, 148 and/or one or more LIDAR sensors 146. However, in some embodiments, the one or more cameras 144, 148 and the one or more LIDAR sensors 146 may be installed in various locations on the vehicle for capturing data from an environment of the vehicle 110.

Still referring to FIGS. 1 and 2, the one or more cameras 144, 148 are coupled to the communication path 120 and communicatively coupled to the electronic control unit 130 and consequently the processor 132 and non-transitory computer readable memory 134. Each of the one or more cameras 144, 148 may be any device having an array of sensing devices (e.g., pixels) capable of detecting radiation in an ultraviolet wavelength band, a visible light wavelength band, or an infrared wavelength band. Each of the one or more cameras 144, 148 may include or be associated with a night vision system or low light system. Each of the one or more cameras 144, 148 may have any resolution; however, high resolution may provide for enhanced light and object identification and detection. Each of the one or more cameras 144, 148 may be an omni-directional camera, or a panoramic camera. In some embodiments, one or more optical components, such as a mirror, fish-eye lens, or any other type of lens may be optically coupled to each of the one or more cameras 144, 148. Each of the one or more cameras 144, 148 may be positioned within or on the vehicle 110 to view the environment external to the vehicle 110. For example, without limitation, each of the one or more cameras 144, 148 may be positioned on the dashboard of the vehicle 110 or within the vehicle headlamp units 136 to capture images of the surroundings in front, alongside, behind, above, or below the vehicle 110 during operation. The position of each of the one or more cameras 144, 148 is not limited to the dashboard or the vehicle headlamp units 136 of the vehicle 110. Each of the one or more cameras 144, 148 may be positioned anywhere on or within the vehicle 110 to capture images of surroundings of the vehicle 110 during operation.

The one or more cameras 144, 148 are implemented to capture images of the surroundings of the vehicle and generate image data that is communicated to the electronic control unit 130 and processor 132. During normal operation, the image data may be received by the processor 132, which process the image data using one or more image recognition, object recognition, and/or other image processing algorithms to enable one or more vehicle systems such as assistive driving or other early warning systems such as cross-traffic alerts or pedestrian alerts. During calibration of the sensors, as described herein, the image data includes at least a portion of a calibration pattern, which is received by the electronic control unit 130. Any known or yet-to-be developed video or image recognition, object recognition, and/or other image processing algorithms may be implemented by the electronic control unit 130 to identify features within the image data of the calibration pattern. Moreover, any known or yet-to-be-developed object recognition algorithms or facial recognition algorithms may be used to extract the objects and features from the image data. Example object recognition algorithms or facial recognition algorithms include, but are not limited to, structure from motion ("SFM"), scale-invariant feature transform ("SIFT"), speeded up robust features ("SURF"), and edge-detection algorithms. The object recognition algorithms or facial recognition algorithms may be stored in the non-transitory computer readable memory 134 and executed by the processor 132.

In some embodiments, the system 100 may include the LIDAR sensor 146. The LIDAR sensor 146 is communicatively coupled to the communication path 120 and the electronic control unit 130. The LIDAR sensor 146 is used in a light detection and ranging system that uses pulsed laser light to measure distances from the LIDAR sensor 146 to objects that reflect the pulsed laser light. The LIDAR sensor 146 may be made of solid-state devices with few or no moving parts, including those configured as optical phased array devices where its prism-like operation permits a wide field-of-view without the weight and size complexities associated with a traditional rotating LIDAR sensor. The LIDAR sensor 146 is particularly suited to measuring time-of-flight, which in turn can be correlated to distance measurements with objects that are within a field-of-view of the LIDAR sensor 146. By calculating the difference in return time of the various wavelengths of the pulsed laser light emitted by the LIDAR sensor 146, a digital 3-D representation of a target or environment may be generated. The pulsed laser light emitted by the LIDAR sensor 146 may be operated in or near the infrared range of the electromagnetic spectrum, with one example having emitted radiation of about 905 nanometers. Sensors such as LIDAR sensor 146 can be used by vehicles such as vehicle 110 to provide detailed 3-D spatial information for the identification of objects near the vehicle 110, as well as the use of such information in the service of systems for vehicular mapping, navigation and autonomous operations, especially when used in conjunction with geo-referencing devices such as GPS or a gyroscope-based inertial navigation unit (INU, not shown) or related dead-reckoning system, as well as non-transitory computer readable memory 134 (either its own or memory of the electronic control unit 130).

Still referring to FIGS. 1 and 2, the system 100 includes a projector 150. The projector 150 is communicatively coupled to the electronic control unit 130. Embodiments of the projector 150 may include any device that is capable of generating and projecting a calibration pattern on a surface 152 visible by sensors of the vehicle 110. The projector 150 may be a laser projector, a lamp projector, or other device capable of projecting an image. In some embodiments, the projector 150 may be the individual lamps 134-141 of the vehicle headlamp units 136. In some embodiments, an IR emitting device or other controllable wavelength-emitting devices may be included with the projector 150, for example, for automatically calibrating the LIDAR sensor 146 systems. The projector 150 may be mounted with or adjacent a rearview mirror assembly, on the dashboard of a vehicle positioned to project the calibration pattern out of the front windshield, or within a vehicle headlamp unit 136, or anywhere else on the vehicle 110 such that the position and location of the projector 150 can be affixed and known to the electronic control unit 130. In some instances, the projector 150 may be calibrated so that its precise location, angle, and other attributes are known with respect to the vehicle 110. For example, in some instances having a calibrated position of the projector 150 with respect to the vehicle 110 enables a more accurate calibration of the sensors 144, 146, 148 of the vehicle 110.

Still referring to FIGS. 1 and 2, the system includes network interface hardware 160 coupled to the communication path 120 and communicatively coupled to the electronic control unit 130. The network interface hardware 160 may be any device capable of transmitting and/or receiving data via a network 170. Accordingly, network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 160 includes hardware configured to operate in accordance with the Bluetooth wireless communication protocol. In another embodiment, network interface hardware 160 may include a Bluetooth send/receive module for sending and receiving Bluetooth communications to/from a network 170. The network interface hardware 160 may also include a radio frequency identification ("RFID") reader configured to interrogate and read RFID tags.

In some embodiments, the system 100 may be communicatively coupled to nearby vehicles via the network 170. In some embodiments, the network 170 is a personal area network that utilizes Bluetooth technology to communicatively couple the system 100 and the nearby vehicles. In other embodiments, the network 170 may include one or more computer networks (e.g., a personal area network, a local area network, or a wide area network), cellular networks, satellite networks and/or a global positioning system and combinations thereof. Accordingly, the system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The following sections will now describe embodiments of the operation of the system 100 for automatically calibrating sensors 144, 146, 148 of a vehicle 110 without reliance on equipment that is not part of the vehicle 110.

Although embodiments disclosed herein refer to systems for automatically calibrating one or more cameras 144, 148 and/or LIDAR sensor 146, other sensors may also be calibrated using the systems and methods described herein.

In general, systems and methods for automatically calibrating sensors of a vehicle include a projector 150, an electronic control unit 130, and the sensors 144, 146, 148 being calibrated. The projector 150 may project a calibration pattern on a surface 152 that is observable by the sensors 144, 146, 148 being calibrated. The sensors 144, 146, 148 capture at least a portion of the calibration pattern and provide the sensor data to the electronic control unit 130. The electronic control unit 130 resolves extrinsic and intrinsic features of each of the sensors 144, 146, 148 based features from the calibration pattern captured by the sensors 144, 146, 148 and, in some instances, the known location of the projector 150. As a result, the electronic control unit 130 computes calibration results for each of the sensors 144, 146, 148.

Referring more specifically to FIG. 2, an illustrated environment including a vehicle 110 and system for calibrating sensors 144, 146, 148 of the vehicle 110 is depicted. As described above, the system includes a projector 150, an electronic control unit 130 (FIG. 1), and the sensors 144, 146, 148 being calibrated. In some embodiments, a vehicle 110 may be parked in front of a surface 152. The surface 152 may be any surface 152 that is positioned such that a projector 150 may project a calibration pattern 155 onto it and the sensors 144, 146, 148 being calibrated are capable of viewing. For example, the surface 152 may be a parking garage wall, a garage door, a hood 162 of the vehicle 110, a sidewall of a structure such as a house or a mechanic shop, or the like. This may enable the sensors 144, 146, 148 of a vehicle 110 to be calibrated in almost any location and on the fly, since no external calibration equipment is required.

As illustratively depicted in FIG. 2, the projector 150 may project a calibration pattern 155. The calibration pattern 155 may be presented on a surface 152 such as a garage door and the sensors 144, 146, 148 may capture all or a portion of the calibration pattern 155. The captured portions of the calibration pattern 155 by the sensors 144, 146, 148 being calibrated are relayed to the electronic control unit 130. The electronic control unit 130 may analyze each of the data streams from the sensors 144, 146, 148 and implement one or more mathematical operations to determine the precise location of each the sensors 144, 146, 148 with respect to each other and/or with respect to a frame of reference of the vehicle 110 (e.g., the projector 150). For example, the electronic control unit 130 may implement feature detection processing algorithms to detect overlapping features within the calibration pattern 155 that are captured by the various sensors 144, 146, 148 to converge on extrinsic calibration values for each of the sensors 144, 146, 148. The electronic control unit 130 may utilize affine transformation to correct for geometric distortions or deformations present in the image data captured by cameras (sensors 144 or 148) or 3-D representation data from a LIDAR sensor 146. LIDAR sensor 146 calibration will be discussed in more detail herein. The electronic control unit 130 may also utilize the information received from the sensors 144, 146, 148 to calibrate intrinsic sensor features.

Figure 3A:
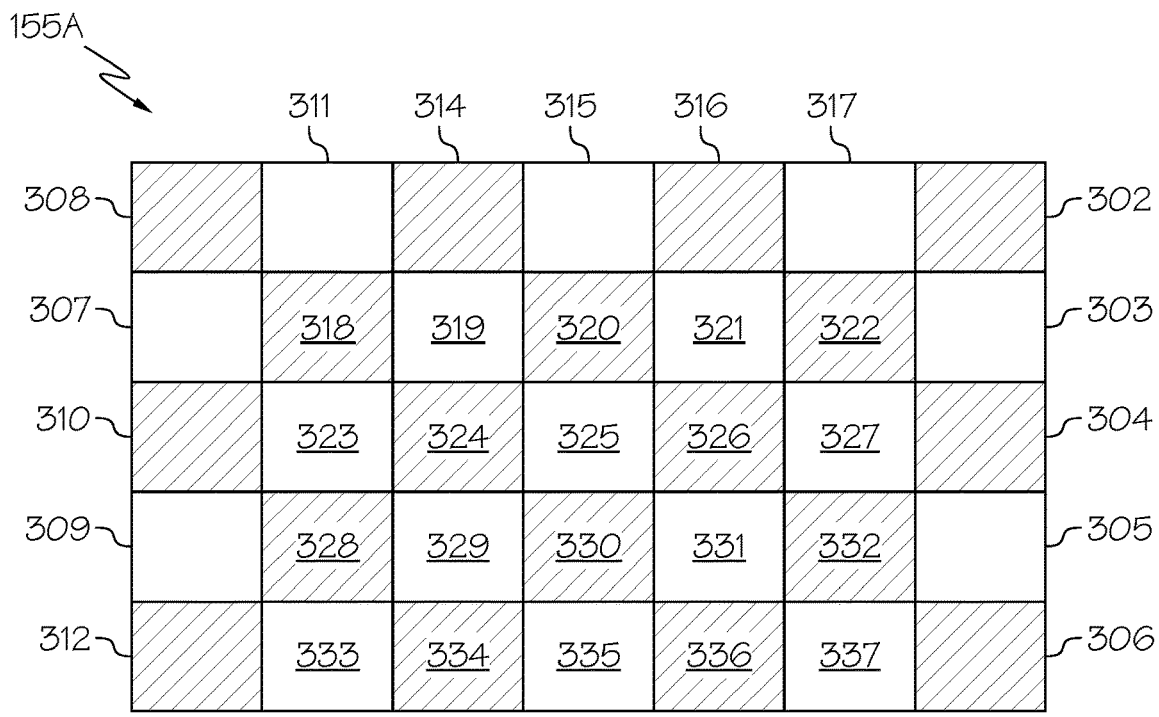
FIG. 3A depicts an illustrative calibration pattern defined by a checkerboard design that is projected by a projector onto a surface according to one or more embodiments shown and described herein.
Figure 3B:
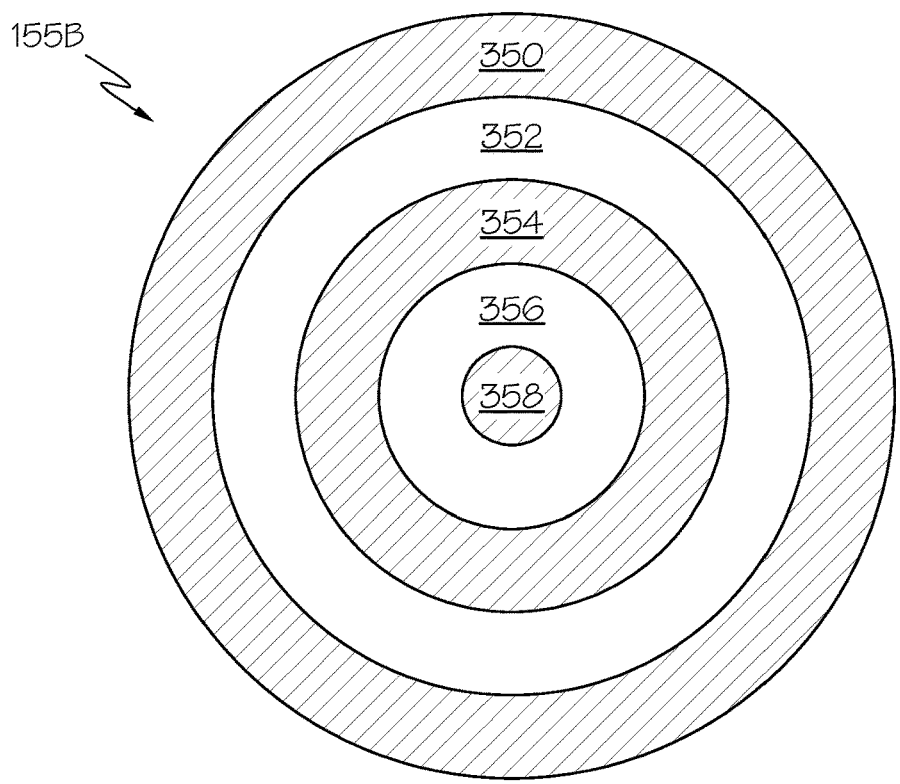
FIG. 3B depicts an illustrative calibration pattern defined by a concentric circle design that is projected by a projector onto a surface according to one or more embodiments shown and described herein.

Referring now to FIGS. 3A and 3B, example calibration patterns are depicted. FIG. 3A depicts a calibration pattern 155A comprising a checkerboard design or grid design. In some instances, the calibration pattern 155A may include individual closed contour shapes or cells 302-337 arranged in a symmetrical layout. The cells 302-337 may be presented in alternating or non-uniform intensities, various wavelengths of electromagnetic emissions or pulsed at various frequencies that may be perceived and captured by the sensors 144, 146, 148 being calibrated. For example, the even numbered cells (e.g., 302, 304, 306, etc.) may be presented with a black color or a color or pattern that is different from that of the odd numbered cells (e.g., 303, 305, 307, etc.). While, the odd numbered cells (e.g., 303, 305, 307, etc.) may be presented with a white color, no color or a color that is different from that of the even numbered cells. In some embodiments, the frequency at which a row, a column, or an individual cell is pulsed may be predefined. For example, by pulsing a first cell 302 at a first predetermined frequency and pulsing a second cell 304 at a second predetermined, captured image data from the cameras 144 and/or 148 being calibrated may be analyzed by the electronic control unit 130 and determined to be different portions of the calibration pattern 155A. Alternatively, in some embodiments, the cells 302-337 may be uniform in color, frequency, and intensity such that the gridlines or edges forming the cells are features which the sensors being calibrated sense and the electronic control unit utilizes to carry out the calibration of the one or more sensors 144, 146, 148.

In some embodiments, each of the cells 302-337 may have a different wavelength and/or frequency associated with it so that an otherwise uniform checkerboard pattern may have additional distinguishing features for the electronic control unit 130 to utilize when calibrating the sensors 144, 146, 148 of the vehicle. Information such as different wavelengths or pulse patterns of the calibration pattern as well as features (e.g., edges) of the calibration pattern may be utilized by the electronic control unit 130 when determining which portions of a calibration pattern each sensor is capturing and to further determine their positional relationship to each other.

FIG. 3A depicts another example calibration pattern 155B comprising a target pattern having a predetermined number of concentric circles. As depicted, alternating concentric circles 350, 352, 354, 356, 358 are associated with a different color or intensity (e.g., portions 350, 354, 358 are depicted as having a black or dark region and portions 352, 356 are depicted as being white or absent of color). As discussed with respect to FIG. 3A above, portions of the calibration pattern 155B may be associated with varying intensities, wavelengths of electromagnetic emissions or pulsed at various frequencies that may be perceived and captured by the sensors 144, 146, 148 being calibrated.

It should be understood that FIGS. 3A and 3B are only two examples of calibration patterns, which may be implemented by the systems and methods described herein. In some embodiments, the calibration pattern may include imagery of asymmetrical features, an arrangement of dots, lines, circles or other shapes or other patterns. In some embodiments, the projector may project a calibration pattern that includes a predefined center point and/or boundary edges that each sensor being calibrated should be calibrated to. That is, the calibration pattern may include a dot or cross hair icon that should appear in the center or along a boundary of the sensors visible field when the sensor is properly calibrated. Based on the location of each of the features within the calibration pattern as sensed by the sensors being calibrated the calibrations of the sensors may be established or updated.

Figure 4:
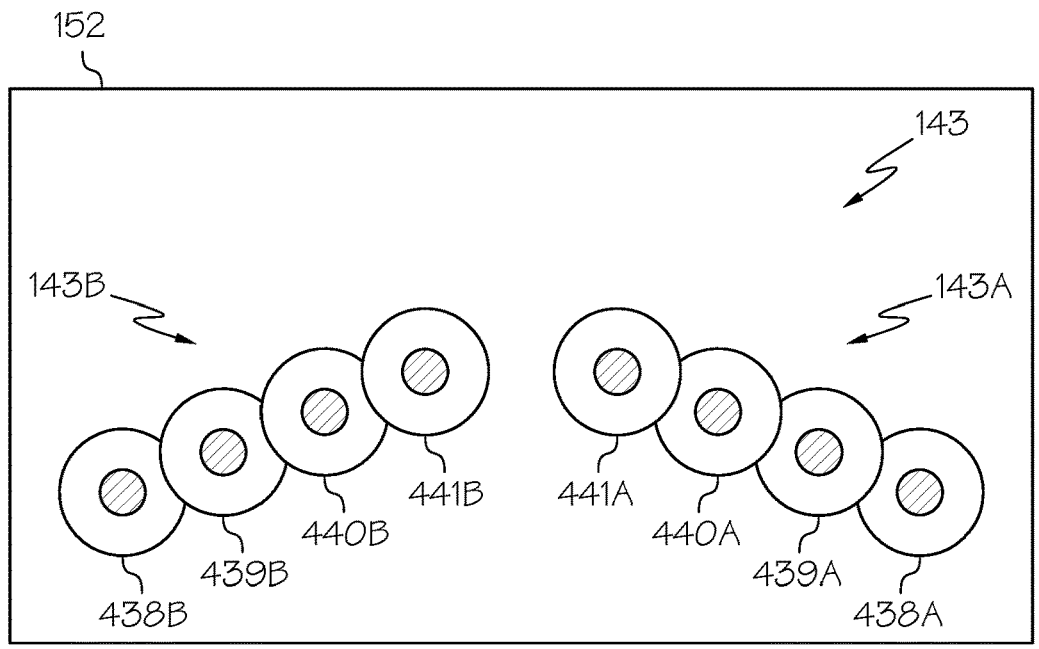
FIG. 4 depicts an illustrative calibration pattern defined by one or more illumination patterns that is projected by a vehicle lamp unit onto a surface according to one or more embodiments shown and described herein.

In some embodiments, the vehicle headlamp units 136 may include one or more individual lamps 138-141 which may be used to generate and project a calibration pattern 143 on the surface 152. For example, referring to FIGS. 2 and 4, the individual lamps 138-141 of each of the vehicle headlamp units 136 (e.g., individually 136A and 136B), may be activated or otherwise controlled (e.g., pulsed at predefined frequencies or driven at various intensities or wavelengths) such that a calibration pattern 143 such as the one depicted in FIG. 4 is generated. The calibration pattern 143 may include focused contours of light reflected by the surface 152 and emitted from each of the individual lamps 138-141 of the vehicle headlamp units 136. More particularly, the individual lamps 138A-141A of first vehicle headlamp unit 136A may generate the contours 143A of light 438A-441A, respectively. Similarly, the individual lamps 138B-141B of the second vehicle headlamp unit 136B may generate the contours 143B of light 438B-441B, respectively. The sensors 144, 146, 148, may sense the reflected light thereby capturing patterns of light intensity, wavelengths of the light and/or frequency of light and transmitting the sensor data to the electronic control unit 130 such that the electronic control unit 130 may calibrate the sensors 144, 146, 148.

Figure 5:
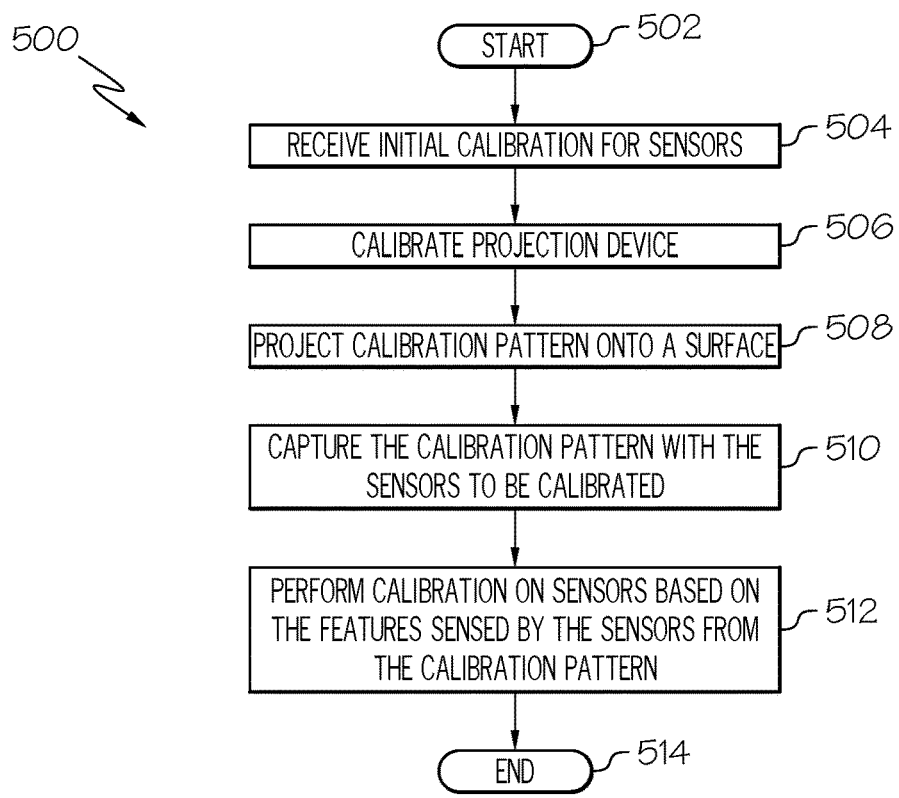
FIG. 5 depicts a flowchart of an example method for automatically calibrating sensors within a vehicle according to one or more embodiments shown and described herein.

Turning now to FIG. 5, methods of automatically calibrating sensors of a vehicle utilizing systems described herein will now be disclosed. FIG. 5 depicts an example flowchart 500 of a method implemented by the electronic control unit (e.g., 130, FIG. 1) and components of the system (e.g., 100, FIG. 1) described herein for automatically calibrating the sensors (e.g., 144, 146, 148, FIG. 1) of the vehicle (e.g., 110, FIGS. 1 and 2). The calibration method may be initialized at block 502 either automatically or manually. Calibration may be automatically initialized when a vehicle determines that one or more sensors require calibration and the vehicle is positioned in a location (e.g., having a surface available) to complete the calibration. Calibration may also be initialized manually through a command received from a user or another electronic control unit to perform a calibration of the sensors of the vehicle.

At block 504, in some instances, the electronic control unit may receive initial calibrations for the sensors. The initial calibrations for the sensors may include estimated installed positions of the sensors on the vehicle. For example, the positions may be defined with reference to a common location on the vehicle such as the location of the projector (e.g., 150, FIGS. 1 and 2), the center of the top of the dashboard, or other location on the vehicle such that an origin for a coordinate reference frame may be established. The initial calibrations may further include initial extrinsic and/or intrinsic values for the sensor. These values may further include tolerances, which may be utilized as a starting point when calibrating the sensors. That is, the calibration process of the sensors may be improved when the calibration process begins with an assumed or estimated calibration value for one or more of the sensors being calibrated. For example, calibration may utilize the initial calibration values and update the initial calibration values accordingly to adjust for any distortions from the initial or prior calibration of the sensors.

At block 506, in some instances, the projector is calibrated. This calibration may be accomplished upon installation and therefore, simply include the step of retrieving the calibration data for the projector. In other cases, the projector may be automatically calibrated in a similar way as the sensors of the vehicle are calibrated. For example, the projector may include, within the device or attached thereto, a sensor such as a camera that is capable of capturing and transmitting a calibration pattern (e.g., a calibration pattern depicted in FIG. 3A, 3B, or 4) projected by the projector to an electronic control unit. Through the captured calibration pattern and a known relationship between the sensor of the projector and the projector, the calibration of the projector may be completed. In some embodiments, the electronic control unit may confirm the calibration pattern is correctly being displayed by projector by comparing the calibration pattern that should be displayed (e.g., as defined in the non-transitory computer readable memory) with the one captured by the sensor of the projector. Referring briefly back to FIG. 2, the camera 148 may be the sensor of the projector 150 that is configured to capture the calibration pattern projected by the projector so that the electronic control unit may calibrate the projector before calibrating the other sensors of the vehicle.

At block 508, the electronic control unit may control the projector such that the projector projects a calibration pattern (e.g., a calibration pattern depicted in FIG. 3A, 3B, or 4, or the like). The calibration pattern may be selected from a number of calibration patterns depending on which sensors are to be calibrated and where the sensors are located on the vehicle. For example, when calibrating sensors that include LIDAR sensors (e.g., 146, FIGS. 1 and 2), the electronic control unit may configure the projector to project a calibration pattern that includes a pattern of dots at predetermined intervals that relate to specific time-of-flight or distances that would be perceived by the LIDAR sensor. The receiving portion of the LIDAR sensor may generate a data stream that is transmitted to the electronic control unit that indicates the perceived distances for each sequence of the pattern of dots. The data stream from the LIDAR sensor may be compared with the known calibration pattern such that the electronic control unit may generate a calibration factor for the LIDAR sensor to correct any discrepancies or distortions. For example, a laser emission dot that is perceivable by the LIDAR sensor (i.e., configured to the frequency and wavelength of the receiving sensor of the LIDAR sensor) may be generated and projected at a first predetermined frequency. Since the distance from the projector to the surface for which the laser dot (i.e., calibration pattern) will be reflected back to the LIDAR sensor may not be known, the electronic control unit may cycle through a series of calibration patterns each having a different but relative change in frequency. For example, the series of calibration patterns may include the first predetermined frequency, a second predetermined frequency that is greater than the first predetermined frequency by a first predetermined value, and a third predetermined frequency that is greater than the second predetermined frequency by a second predetermined value, and optionally additional predetermined frequencies. Each of the first and second predetermined frequencies may relate to relative changes in distance and may be utilized to determine whether the LIDAR sensor is calibrated to accurately sense the various relative changes. If not, there may be an issue with the LIDAR sensor such as the presence of drift. If drift is determined, further calibration may be necessary to correct the drift in the measured responses of the LIDAR sensor.

In some embodiments, the sensors may be cameras and the system may be implemented to calibrate the position and angle of each of the cameras with respect to the vehicle and the projector. At block 510, the sensors (e.g., cameras) capture portions or the entire calibration pattern as image data. The image data from each of the sensors being calibrated is transmitted to the electronic control unit. For example, a first sensor may capture a first portion of the calibration pattern and a second sensor may capture a second portion of the calibration pattern. The first portion and the second portion may include overlapping portions of the calibration pattern or may include distinct portions of the calibration pattern.

At block 512, the electronic control unit receives the captured image data of the calibration pattern from each of the sensors (e.g., cameras or LIDAR sensors) and based on detection of one or more features (e.g., an edge, an object, a differentiation in the frequency or wavelength of a reflected light source, or the like) sensed by the sensors from the calibration pattern the electronic control unit may determine the calibration of each sensor. That is, the electronic control unit may implement image and object recognition algorithms to identify common edges or other features within portions of the calibration pattern captured by the sensors and/or may correlate the portions to the known calibration pattern and/or with other portions of the calibration pattern captured by the other sensors being calibrated to configured the view angle, focal length, distance, position, or the like of each camera. In some embodiments, the calibration pattern and aspect ratio for each of the features within the pattern may be known by the electronic control unit and utilized for mapping the sensors' sensed portions of the calibration pattern to the reference calibration pattern and thus determining the location of each sensor. For example, the electronic control unit may have a reference frame of the calibration pattern, which is analyzed and compared with the sensed patterns from the sensors. The electronic control unit may implement affine transformations, which include, for example, translation, scaling, homothety, similarity transformation, reflection, rotation, shear mapping, and compositions of them in any combination and sequence to determine the position, angle and other intrinsic and extrinsics values of the sensor. It should be understood that while affine transformation is disclosed herein other methods of determining the position, angle, and/or other intrinsic or extrinsics values of the sensors being calibrated may be implemented using the system described herein.

Once calibration of the sensors is complete, for example, when the positions, angles and/or other intrinsic or extrinsics values of the sensors are determined to converge, the calibration process may be completed, at block 514.

It should now be understood that embodiments described herein are directed to systems and methods for automatically calibrating sensors on a vehicle without external calibration equipment. The systems and methods that integrate a calibration system and methods of calibration within a vehicle utilizing mathematical relationships based on an initial or assumed calibration of the sensors being calibrated. The automatic vehicle calibration systems include a projector, an electronic control unit, and the sensors being calibrated. The projector projects a calibration pattern on a surface that is observable by the sensors being calibrated. The sensors capture at least a portion of the calibration pattern and provide the sensor data to the electronic control unit. The electronic control unit resolves extrinsic and intrinsic features of each of the sensors based features (e.g., sensed pixel or edge positions) from the calibration pattern captured by the sensors and, in some instances, utilizing a known location of the projector with respect to the vehicle. As a result, the electronic control unit computes calibration values for each of the sensors. The calibration values may include positions, angles and/or other intrinsic and extrinsics values for the sensors.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for automatically calibrating sensors of a vehicle comprising:
   an electronic control unit;
   a projector and a sensor of the projector communicatively coupled to the electronic control unit;
   a first sensor communicatively coupled to the electronic control unit; and
   a second sensor communicatively coupled to the electronic control unit,
   wherein the electronic control unit is configured to:
      project, with the projector, a calibration pattern onto a surface that is observable by the sensor of the projector, the first sensor, and the second sensor;
      capture, with the sensor of the projector, an image of the calibration pattern;
      adjust a projection, projected by the projector, of the calibration pattern on the surface so that the image of the calibration pattern captured by the sensor of the projector corresponds to a predefined calibration pattern for projection;
      capture, with the first sensor, a first portion of the calibration pattern;
      capture, with the second sensor, a second portion of the adjusted projection of the calibration pattern; and
      calibrate the first sensor and the second sensor based on at least one feature sensed within the first portion of the calibration pattern and the second portion of the calibration pattern.

2. The system of claim 1, wherein the electronic control unit is configured to:
   receive an initial calibration for the first sensor and the second sensor, and
      calibrate the first sensor and the second sensor by utilizing a position of the first sensor and the second sensor as defined in the initial calibration and update the position of the first sensor and the second sensor.

3. The system of claim 1, wherein the electronic control unit is configured to:
   calibrate at least one of an extrinsic feature or an intrinsic feature of the first sensor and the second sensor.

4. The system of claim 1, wherein the electronic control unit is configured to:
   update a position of the first sensor relative to the projector and a position of the second sensor relative to the projector.

5. The system of claim 1, wherein the electronic control unit is configured to:
   calibrate the projector such that a mounting position and orientation of the projector with respect to the vehicle is determined.

6. The system of claim 1, wherein the projector includes a laser projector.

7. The system of claim 1, wherein the projector includes one or more vehicle headlamp units.

8. The system of claim 1, wherein the calibration pattern includes one or more portions having different intensities, wavelengths, or frequencies of electromagnetic emissions.

9. The system of claim 1, wherein a hood of the vehicle is the surface that the calibration pattern is projected on to by the projector.

10. A method for automatically calibrating vehicle sensors, the method comprising:
    projecting, with a projector, a calibration pattern onto a surface that is observable by a sensor of the projector, a first sensor, and a second sensor;
    capturing, with the sensor of the projector, an image of the calibration pattern;
    adjusting a projection, projected by the projector, of the calibration pattern on the surface so that the image of the calibration pattern captured by the sensor of the projector corresponds to a predefined calibration pattern for projection;
    capturing, with the first sensor, a first portion of the calibration pattern;
    capturing, with the second sensor, a second portion of the adjusted projection of the calibration pattern; and
    calibrating the first sensor and the second sensor based on at least one feature sensed within the first portion of the calibration pattern and the second portion of the calibration pattern.

11. The method of claim 10, further comprising receiving an initial calibration for the first sensor and the second sensor, wherein the step of calibrating the first sensor and the second sensor utilizes a position of the first sensor and the second sensor as defined in the initial calibration and updates the position of the first sensor and the second sensor.

12. The method of claim 10, wherein calibrating includes calibrating at least one of an extrinsic feature and an intrinsic feature of the first sensor and the second sensor.

13. The method of claim 10, wherein calibrating includes updating a position of the first sensor relative to the projector and a position of the second sensor relative to the projector.

14. The method of claim 10, further comprising calibrating the projector such that a mounting position and orientation of the projector with respect to a vehicle is determined.

15. The method of claim 10, wherein the projector includes a laser projector.

16. The method of claim 10, wherein the projector includes one or more vehicle headlamp units.

17. The method of claim 10, wherein the calibration pattern includes one or more portions having different intensities, wavelengths or frequencies of electromagnetic emissions.

18. The method of claim 10, wherein a hood of a vehicle is the surface that the calibration pattern is projected on to by the projector.

19. A vehicle comprising:
    an electronic control unit;
    a projector and a sensor of the projector communicatively coupled to the electronic control unit;
    a first camera communicatively coupled to the electronic control unit; and
    a second camera communicatively coupled to the electronic control unit,
    wherein the electronic control unit is configured to:
       project, with the projector, a calibration pattern onto a surface that is observable by the sensor of the projector, the first sensor, and the second sensor;
       capture, with the sensor of the projector, an image of the calibration pattern;
       adjust a projection, projected by the projector, of the calibration pattern on the surface so that the image of the calibration pattern captured by the sensor of the projector corresponds to a predefined calibration pattern for projection;
capture, with the first camera, a first portion of the calibration pattern;
capture, with the second camera, a second portion of the adjusted projection of the calibration pattern; and
calibrate the first camera and the second camera based on at least one feature sensed within the first portion of the calibration pattern and the second portion of the calibration pattern.

20. The vehicle of claim 19, wherein the electronic control unit is configured to:
receive an initial calibration for the first camera and the second camera, wherein the step of calibrating the first camera and the second camera utilizes a position of the first camera and the second camera as defined in the initial calibration and updates the position of the first camera and the second camera.

* * * * *